United States Patent
Ramsey et al.

(10) Patent No.: US 7,309,075 B2
(45) Date of Patent: Dec. 18, 2007

(54) TRAILER ALIGNMENT DEVICE

(76) Inventors: J. Edward Ramsey, 1700 CR8, Bristol, IN (US) 46507; John S. Betts, P.O. Box 1840, Woodstock, IL (US) 60098

( * ) Notice: Subject to any disclaimer, the term of this patent is extended or adjusted under 35 U.S.C. 154(b) by 0 days.

(21) Appl. No.: 11/158,808

(22) Filed: Jun. 22, 2005

(65) Prior Publication Data
US 2005/0285371 A1 Dec. 29, 2005

Related U.S. Application Data

(60) Provisional application No. 60/521,713, filed on Jun. 23, 2004.

(51) Int. Cl.
*B60D 1/36* (2006.01)
(52) U.S. Cl. .................. 280/477; 340/431; 340/435
(58) Field of Classification Search ................ 280/477
See application file for complete search history.

(56) References Cited

U.S. PATENT DOCUMENTS

| | | | |
|---|---|---|---|
| 3,825,921 A | 7/1974 | Marus et al. | |
| 3,924,257 A * | 12/1975 | Roberts | 340/431 |
| 4,187,494 A | 2/1980 | Jessee | |
| 4,852,901 A * | 8/1989 | Beasley et al. | 280/477 |
| 5,159,312 A | 10/1992 | Engle | |
| 5,191,328 A * | 3/1993 | Nelson | 340/870.06 |
| 5,455,557 A * | 10/1995 | Noll et al. | 340/431 |
| 5,650,764 A | 7/1997 | McCullough | |
| 5,729,194 A | 3/1998 | Spears et al. | |
| 5,861,814 A * | 1/1999 | Clayton | 340/687 |
| 6,100,795 A * | 8/2000 | Otterbacher et al. | 340/431 |
| 6,120,052 A * | 9/2000 | Capik et al. | 280/477 |
| 6,801,125 B1 * | 10/2004 | McGregor et al. | 340/431 |
| 2005/0128059 A1 * | 6/2005 | Vause | 340/431 |

* cited by examiner

*Primary Examiner*—Lesley D. Morris
*Assistant Examiner*—Marlon Arce-Diaz
(74) *Attorney, Agent, or Firm*—Van Dyke, Gardner, Linn & Burkhart, LLP

(57) ABSTRACT

A trailer hitch alignment device which allows a user to easily align a hitch of a vehicle with a trailer hitch of a trailer. The trailer hitch alignment device includes a control unit with a display that is viewable by the driver of a vehicle, a sensor releasably positioned on a ball hitch of the vehicle, and another sensor releasably positioned over a socket hitch of the trailer. At least one of the sensor and the another sensor communicates with the control unit. The control unit display displays the relative position of the sensor to the another sensor.

22 Claims, 11 Drawing Sheets

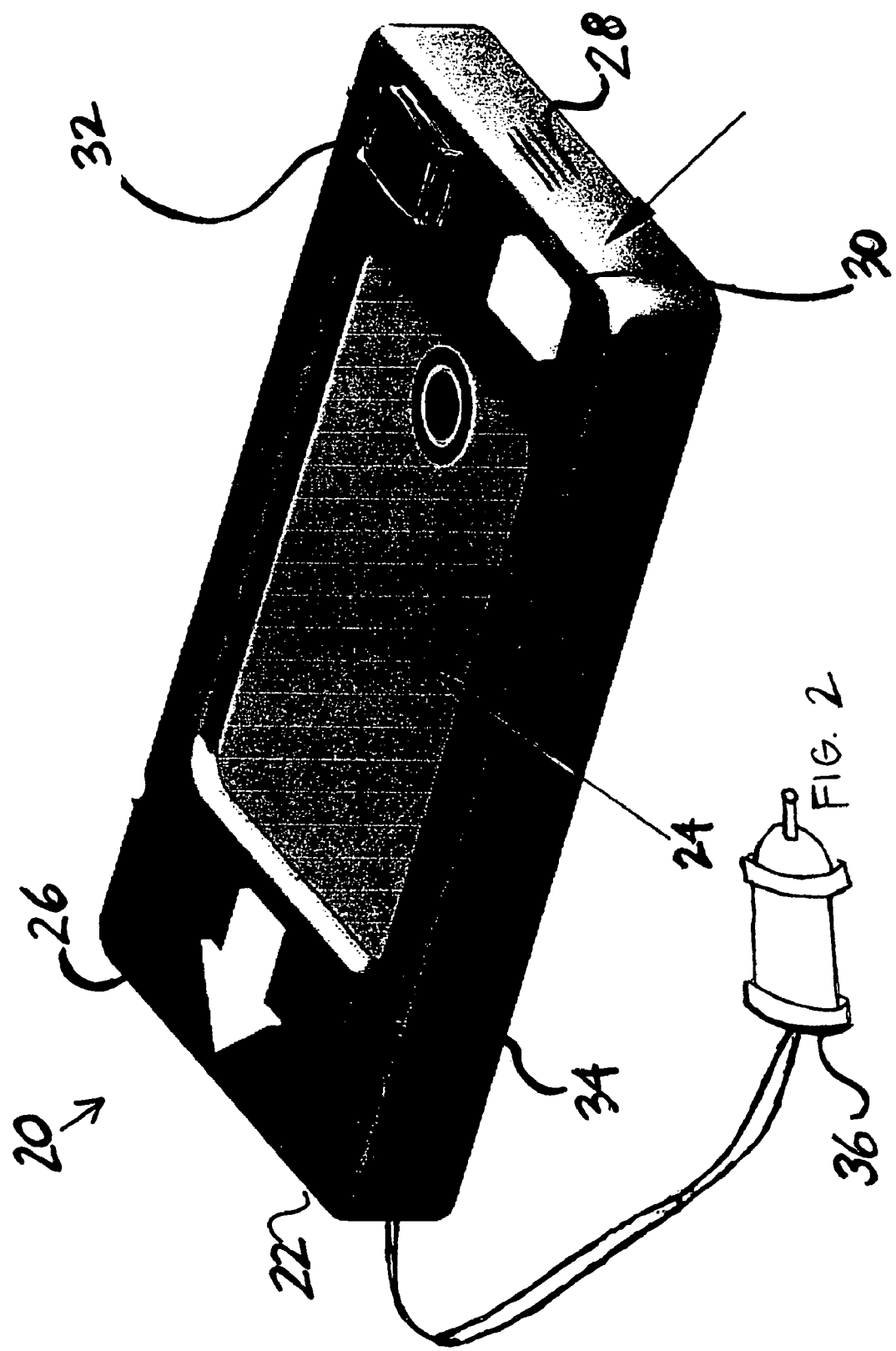

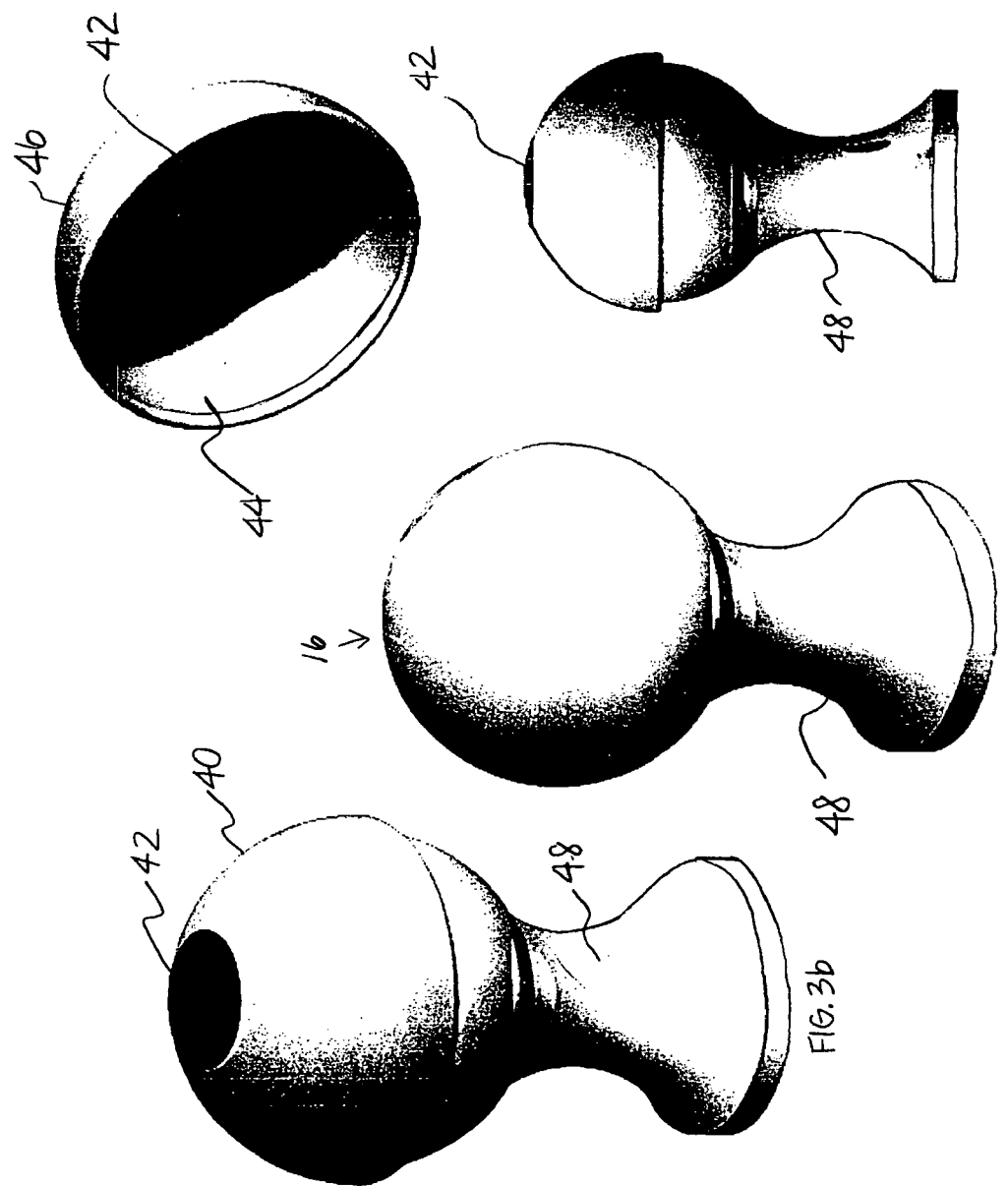

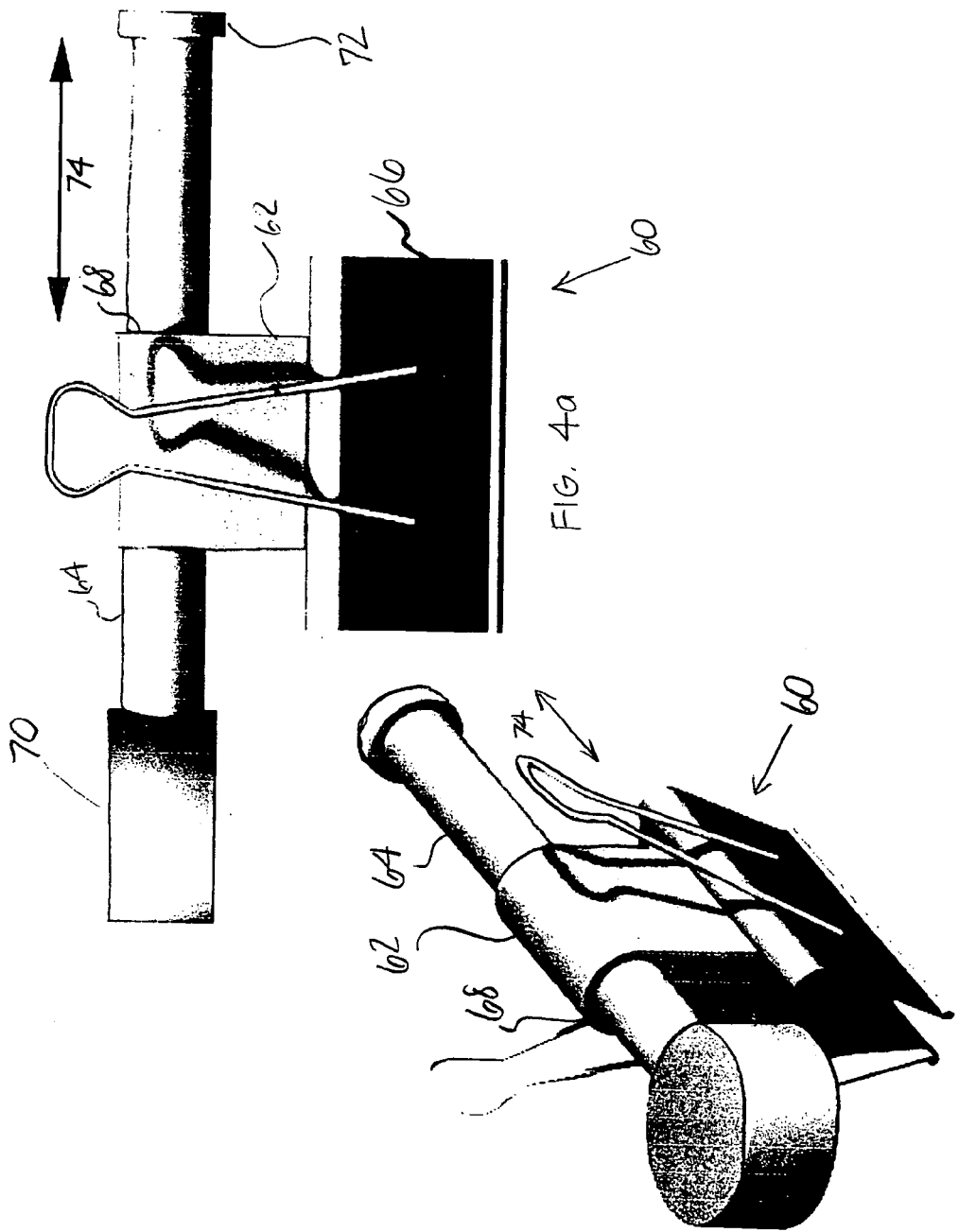

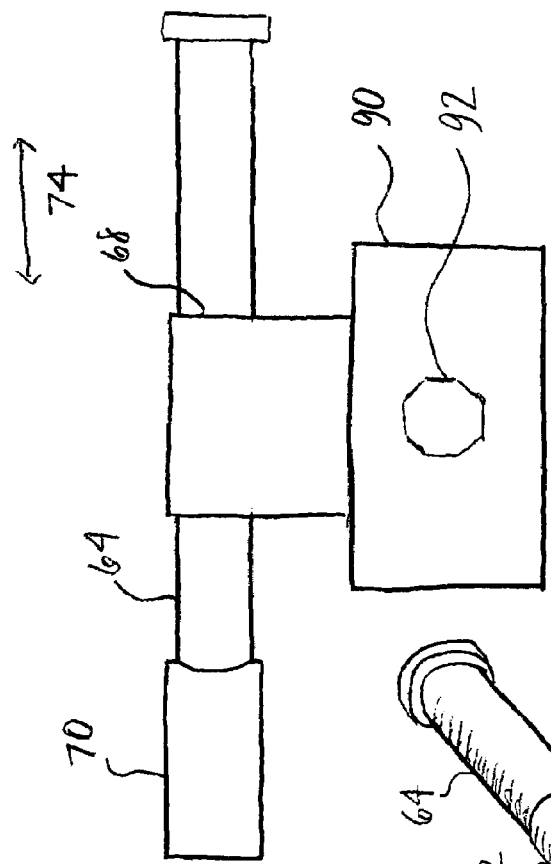
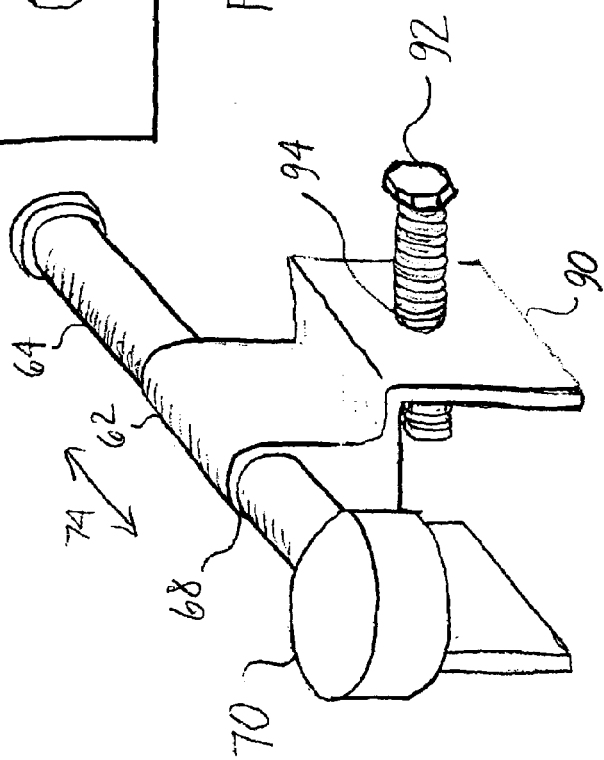

TRAILER ALIGNMENT DEVICE

CROSS REFERENCE TO RELATED APPLICATION

The present application claims priority of U.S. provisional application Ser. No. 60/521,713, filed Jun. 23, 2004, by Ramsey et al. for a TRAILER ALIGNMENT DEVICE, which is hereby incorporated herein by reference in its entirety.

BACKGROUND OF THE INVENTION

The present invention relates generally to trailer locating devices and more specifically it relates to a trailer hitch alignment system for allowing a user to easily align a hitch of a vehicle with a trailer hitch.

Users of trailers often have great difficulty in aligning their vehicle's hitch with the trailer hitch of a conventional trailer. A conventional trailer has a plurality of wheels rotatably supporting a frame and a trailer hitch for removably coupling with a vehicle that will be towing the conventional trailer. The user must align the hitch of the vehicle with the raised trailer hitch. This is extremely difficult since the hitch is usually out of viewing because of its location upon the vehicle's bumper. Generally, two persons are required to effectively and efficiently align the vehicle hitch with the trailer hitch. However, when the user is trying to align the hitches alone, the user must then slowly back up to the trailer hitch so as to prevent damage to the vehicle and trailer, stop the vehicle, exit the vehicle, view the position of the hitch relative to the trailer hitch to prevent damage to the trailer hitch and/or the vehicle, and then re-enter the vehicle to repeat the process. This process is then generally repeated numerous times until the vehicle hitch and trailer hitch align. Hence, there is a need for a trailer hitch alignment system that allows a user to conveniently and precisely align a vehicle hitch with a trailer hitch without the user having to repeatedly exit the vehicle.

The repeated exiting and entering the vehicle is undesirable to users. In addition, the constant exiting and entering of the vehicle is time consuming and potentially dangerous. Another issue is the inevitable likelihood of vehicle or trailer damage during attempts for trailer hitch alignment.

Devices presently in the art for trailer hitch alignment include systems utilizing cameras that are attached to the rear of the vehicle and display in the passenger compartment a view of the vehicle trailer hitch. Other devices include systems with mirrors mounted to provide a view of the vehicle's hitch. These systems are often expensive, inconvenient, and cumbersome to use.

SUMMARY OF THE INVENTION

In view of the foregoing disadvantages inherent in the known types of trailer locating devices now present in the prior art, the present invention provides a new electronic trailer hitch alignment system wherein the same can be utilized for allowing a user to easily align a hitch of a vehicle with a trailer hitch. In these respects, the trailer hitch alignment system according to the present invention substantially departs from the conventional concepts and designs of the prior art, and in so doing provides an apparatus primarily developed for the purpose of allowing a user to easily align a hitch of a vehicle with a trailer hitch.

The general purpose of the present invention, which will be described subsequently in greater detail, is to provide a new electronic trailer hitch alignment system that has many of the advantages of the trailer locating devices mentioned heretofore and many novel features that result in a new trailer hitch alignment system which is not anticipated, rendered obvious, suggested, or even implied by any of the prior art trailer locating devices, either alone or in any combination thereof.

To obtain this, the present invention generally comprises a control unit that is handheld, or mountable within the passenger compartment of a vehicle in view of the driver. A hitch sensor unit attachable to a hitch of a vehicle and in communication with the control unit, a trailer hitch sensor unit removably attachable to a trailer hitch and in communication with a control unit. Electronic circuitry within the control unit determines the position of the vehicle hitch sensor and trailer hitch sensor. The control unit includes a display screen for visually indicating to the user whether to turn left or right while backing towards the conventional trailer. The control unit may also include a speaker and/or indicator light for indicating to the user when the vehicle hitch is positioned directly below the coupler of the trailer hitch. The control unit display screen may also visually indicate the position of the vehicle hitch sensor with respect to the trailer hitch sensor. If the user needs to turn left or right, the display screen, in real time, will indicate to the user which turn is appropriate for proper alignment of the vehicle with the conventional trailer.

Before explaining at least one embodiment of the present invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of the description and should not be regarded as limited.

An electronic trailer hitch alignment system in one detailed embodiment that will overcome the shortcomings of the prior art devices. In particular, an electronic trailer hitch alignment system is provided that allows a user to easily align a vehicle with a trailer. It further reduces the number of times the user must exit the vehicle during attachment of a vehicle to a conventional trailer.

A further object is to provide an electronic trailer hitch alignment system according to this embodiment that offers superior portability and can be easily removed for utilization upon multiple trailers or vehicles. In particular, it does not require additional apertures to attach the components of the system to either the vehicle or conventional trailer. It does not utilize mechanical devices, switches or cables for the alignment process. Also, the electronic trailer hitch alignment system does not utilize electrical wires or cables between the components of the system for the alignment process.

Further, the electronic trailer hitch alignment system visually and audibly indicates the position of the vehicle hitch with respect to the conventional trailer. It further indicates to the user in a display the relative position of the user vehicle with the conventional trailer. The electronic trailer hitch alignment system indicates to the user whether they should turn right or left, and continue moving backward, when aligning the vehicle with the conventional trailer.

Other objects and advantages of the present invention will become obvious to the reader and it is intended that these objects and advantages are within the scope of the present invention.

BRIEF DESCRIPTION OF THE DRAWINGS

FIG. 2 is a perspective view of a control unit according to the present invention;

FIG. 3a is a perspective view of a conventional vehicle hitch and a vehicle hitch sensor unit according to the present invention;

FIG. 3b is a perspective view of the vehicle hitch sensor unit received by a vehicle hitch shown in FIG. 3a;

FIG. 3c is a side elevation of the vehicle hitch sensor unit received over the vehicle hitch as shown in FIG. 3b;

FIG. 4a is a side elevation of the trailer hitch sensor according to the present invention;

FIG. 4b is a perspective view of the trailer hitch sensor shown in FIG. 4a;

FIG. 7a is a side elevation of a trailer hitch sensor according to another embodiment of the present invention;

FIG. 7b is a perspective view of the trailer hitch sensor shown in FIG. 7a;

DESCRIPTION OF THE PREFERRED EMBODIMENT

Figure 1:
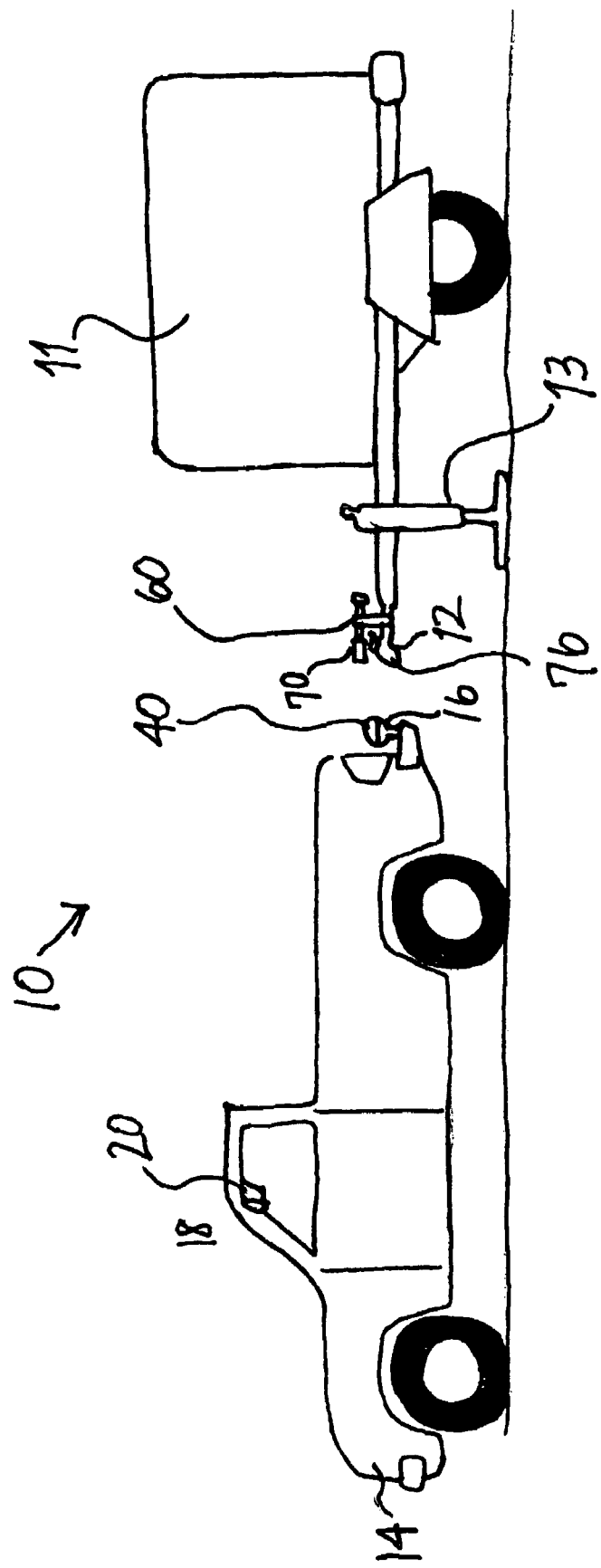
FIG. 1 is a side elevation of the present invention attached to the vehicle and the trailer hitch.

Referring now specifically to the drawings and the illustrative embodiments depicted therein, FIG. 1 illustrates an electronic trailer hitch alignment system 10 of the present invention integrated onto a vehicle 14 and a trailer 11. Trailer hitch alignment system 10 includes a control unit 20, a vehicle hitch sensor unit 40, and a trailer hitch sensor unit 60.

Control unit 20 may be portable and mountable in the passenger compartment of vehicle 14 to provide guidance to a user during a trailer alignment process. Control unit 20 includes a display screen 24 that is mounted in a convenient location which is viewable to the user, such as a visor 18 of vehicle 14, as best illustrated in FIG. 1. Control unit 20 includes a housing 22 receiving illuminated display screen 24, a light 26, a speaker 28, a plurality of buttons 30, 32, and an electronic circuit 34, as best illustrated in FIG. 2. Housing 22 may include a mounting means to mount control unit 20 within the passenger compartment of vehicle 14, such mounting means include but are not limited to clips, Velcro, hooks, or any other suitable attachment means. Alternatively, control unit 20 may be permanently mounted in the vehicle. Also, display screen 24 may be a separate unit from housing 22.

Electronic circuit 34 preferably communicates wirelessly with vehicle hitch sensor unit 40 which may sense a coupler 76 of a trailer hitch 12. Alternatively, vehicle hitch sensor unit 40 may be used in combination with trailer hitch sensor unit 60 to determine and calculate the relative positions of a vehicle hitch sensor 42 and a trailer hitch sensor 70 with respect to one another. Electronic circuit 34 includes a receiver and/or a transmitter to communicate with vehicle hitch sensor unit 40 and/or trailer hitch sensor unit 60. Electronic circuit also includes a processor for calculating the relative positions of sensor units 40, 60. Communications between control unit 20, vehicle hitch sensor unit 40 and trailer hitch sensor unit 60 is preferably accomplished by radio frequency (RF) coupling. However, the present invention also contemplates other similar wireless communication means for communication between the components, such as infrared, WiFi, other IEEE standards, any RF algorithmic programming means or hard wiring between electronic circuit 34 and vehicle hitch sensor unit 40. Alternatively, the present invention also contemplates the utilization of global positioning systems (GPS) technologies to display the relative positions of sensor units 40, 60 from each other.

Display screen 24 is electrically connected to electronic circuit 34. Electronic circuit 34 communicates the relative positions of vehicle hitch sensor unit 40 and trailer hitch sensor unit 60 for display screen 24 to display. Display screen 24 may be a liquid crystal display (LCD) screen, a light emitting diode (LED) display screen, a cathode ray tube (CRT) display screen, a quartz display screen, a touch screen display screen, a plasma display screen, or the like. For example, screen 24 may be a LED type display screen with a plurality of LEDs forming the display screen, such as 600 LEDs across by 1024 LEDs down. Moreover, magnification overlays may be added onto screen 24 to enlarge screen to ease viewing. In the illustrative embodiment of FIG. 2, display screen 24 displays the relative positions of vehicle hitch sensor and trailer hitch sensor 70, represented by a ball 52 and a ring 54, respectively. When vehicle hitch sensor is directly below trailer hitch sensor 70, ball 52 will be displayed inside of ring 54 on display 24, as illustrated in FIG. 2. Additionally, display screen 24 may display other information to the user, such as information used to calibrate or adjust settings and parameters for trailer alignment system 10. Moreover, display screen 24 may be a backlit screen, or any like display illuminating means, to allow for use at night or when in a dark space.

Control unit 20 may further include audio and visual indicators to assist users during the trailer alignment process, such as a light 26 and/or a speaker 28. Electronic circuit 34 sends a message, a pulse, or the like, to illuminate light 26 or to sound speaker 28, during the alignment process or when there is an indication of alignment. Light 26 is received by housing 22 and viewable by the user. Light 26 is connected to electronic circuit 34. Light 26 may be a standard bulb light, an LED, or any other type of illuminating means. Speaker 28 is electrically connected to electronic circuit 34, received by housing 22 and audible by the user. Speaker 28 may be a buzzer, beeper or any other type of sound producing means to notify the user. Additionally, light 26 and speaker 28 may provide further indications of relative positions of vehicle hitch sensor and trailer hitch sensor 70. For example, light 26 may flash slower when the relative distance between vehicle hitch sensor and trailer hitch sensor 70 is greater. As vehicle hitch sensor and trailer hitch sensor 70 get closer to each other, light 26 may flash quicker and eventually turn solid when the sensors align. Likewise, speaker 28 emits a beeping sound that beeps quicker as vehicle hitch sensor and trailer hitch sensor 70 get closer to each other, and eventually, the speaker emits a constant sound when alignment of the sensors occurs.

In the illustrative embodiments, control unit 20 includes a connectable power source 36. Connectable power source 36 is an adaptor to connect with a cigarette automobile light power adapter as shown in FIG. 2. Alternatively, control unit 20 includes a portable power source integrated into the control unit, such as a battery, to make the control unit fully portable. Further, in this embodiment, connectable power source 36 is detachable from central unit 20 and provides power to the battery for recharging. It should be recognized that a plurality of power sources may be used, such as a lithium ion rechargeable battery or the like. Control unit 20 also includes a plurality of user inputs 30, 32 to perform a plurality of functions. For example, button 30 may be an on/off button and button 32 may be a reset or recalibration button. It should be appreciated that the functionality of buttons 30, 32 may be any user-determined function appropriate for the device and application. Moreover, a plurality of buttons may be integrated onto control unit 20. For example a Qwerty keypad may be placed onto control unit 20. Also, other user interface devices, such as dials, knobs, or the like, may be integrated onto control unit 20. Alternatively, the control unit may be hard wired to the vehicle battery's system.

In the illustrative embodiments, vehicle hitch sensor unit 40 is releaseably positioned on a vehicle hitch 16 located on vehicle 14, as best illustrated as a ball hitch in FIGS. 3a-3c. Vehicle hitch sensor unit 40 is preferably in wireless communication with control unit 20. Vehicle hitch sensor unit 40 is also capable of communicating and interacting with trailer hitch sensor unit 60. Vehicle hitch sensor unit 40 preferably includes a housing 46 with a dome-shaped cavity 44 for receiving vehicle hitch 16. Housing 46 receives a vehicle hitch sensor 42, which includes sensor circuitry such as ultrasonic transducers, piezoelectric circuitry, electromagnets, and/or the like for use in determining relative positions of the vehicle hitch sensor to trailer hitch sensor 70 or other components and structures. In the illustrative embodiments, vehicle hitch sensor housing 46 has a dome-like shape with cavity 44 receiving vehicle hitch 16. Cavity 44 preferably has a diameter slightly larger than standard diameters of vehicle hitches to accommodate a plurality of vehicle hitches, with various diameters easily and securely. One of the many advantages of the present invention is vehicle hitch sensor unit 40 is placed directly on, or substantially proximate to, vehicle hitch 16 for a precise reference location of the vehicle hitch during the alignment process. Moreover, the present invention is capable of placement directly onto vehicle hitch 16 of a plurality of configurations and hitch lengths.

However, it can be appreciated that housing 46 may be a plurality of shapes and sizes, and including a dome-like recess cavity 44 to receive vehicle hitch 16. When vehicle hitch sensor unit 40 is received by vehicle hitch 16, as illustrated in FIG. 3c, the size, height, and the overall diameter of vehicle hitch 16 is not substantially increased, increasing the overall clearance height of the vehicle hitch in a range between 0.1" and 3". Vehicle hitch sensor unit 40 provides enough clearance for trailer hitch 12 and coupler 76 to be placed directly over the vehicle hitch, during the alignment process, making coupling of the vehicle hitch with the trailer hitch easier and more precise. Vehicle hitch sensor is preferably powered by a small power source provided within housing 46 of vehicle hitch sensor unit 40, such as a battery or the like.

Figure 5A:
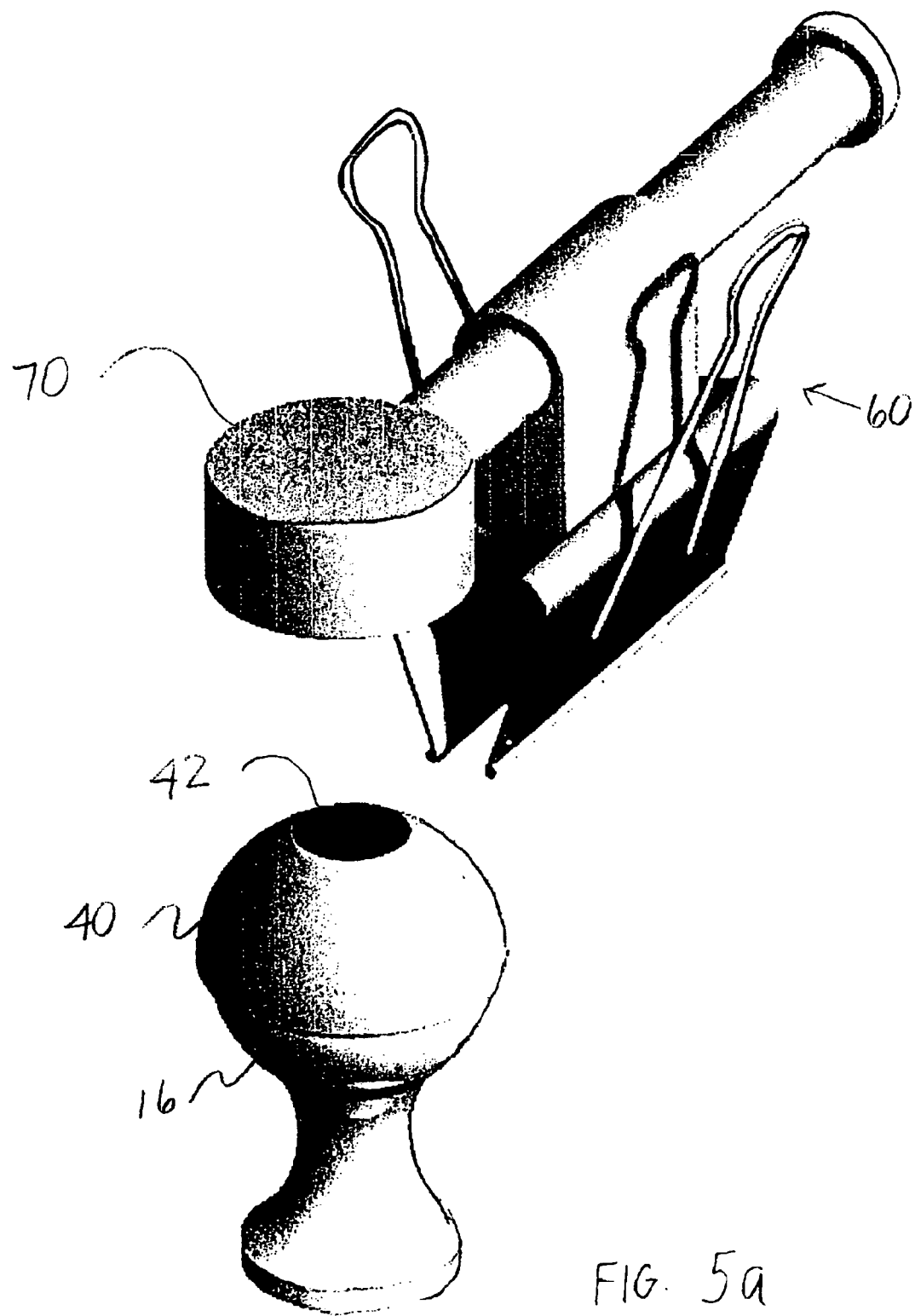
FIG. 5a is a perspective top view of the hitch receiving a vehicle hitch sensor unit with the trailer hitch sensor unit according to the present invention.
Figure 5B:
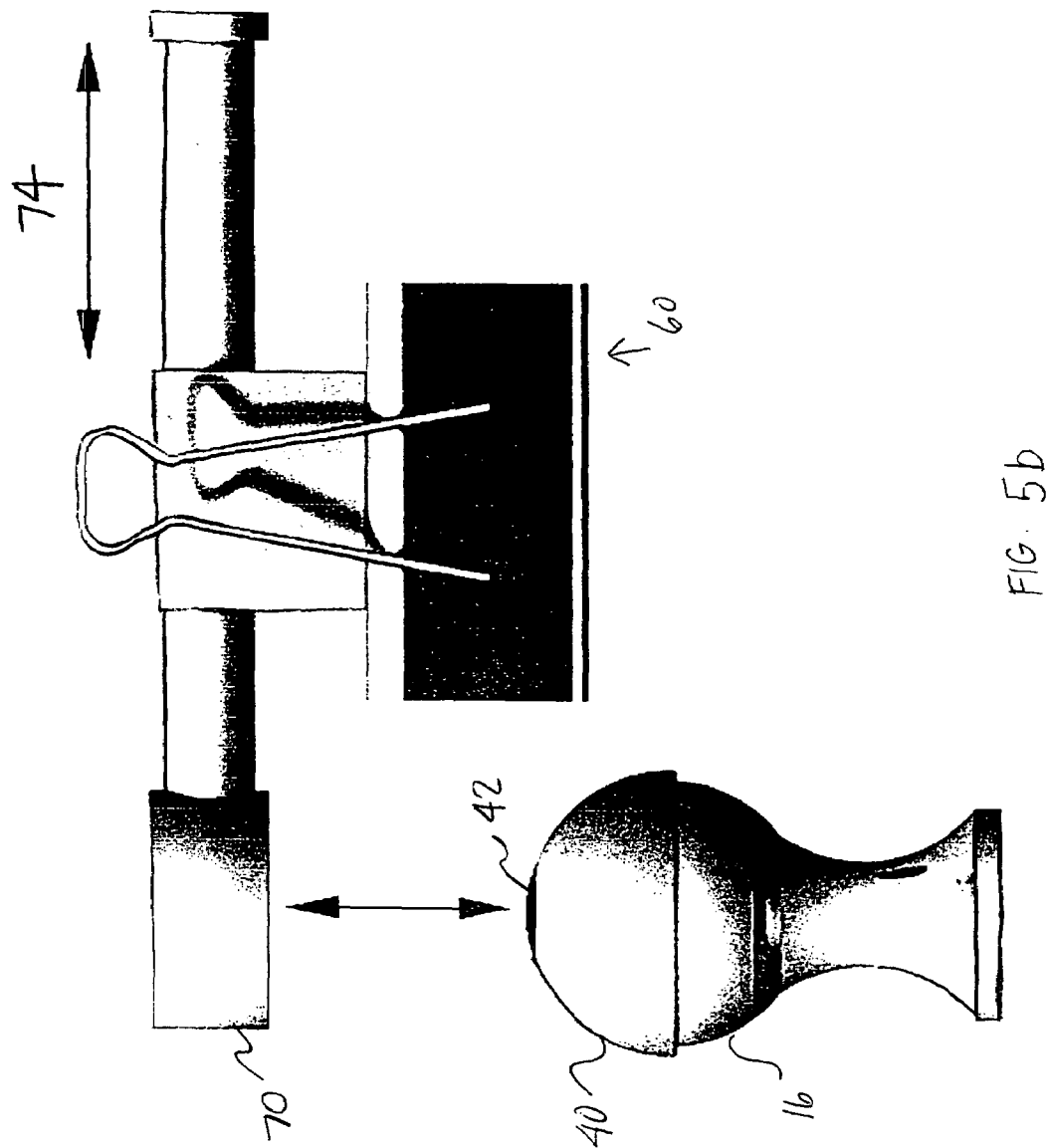
FIG. 5b is a side elevation of the alignment of the hitch sensor unit and the trailer hitch sensor unit according to the present invention.
Figure 5C:
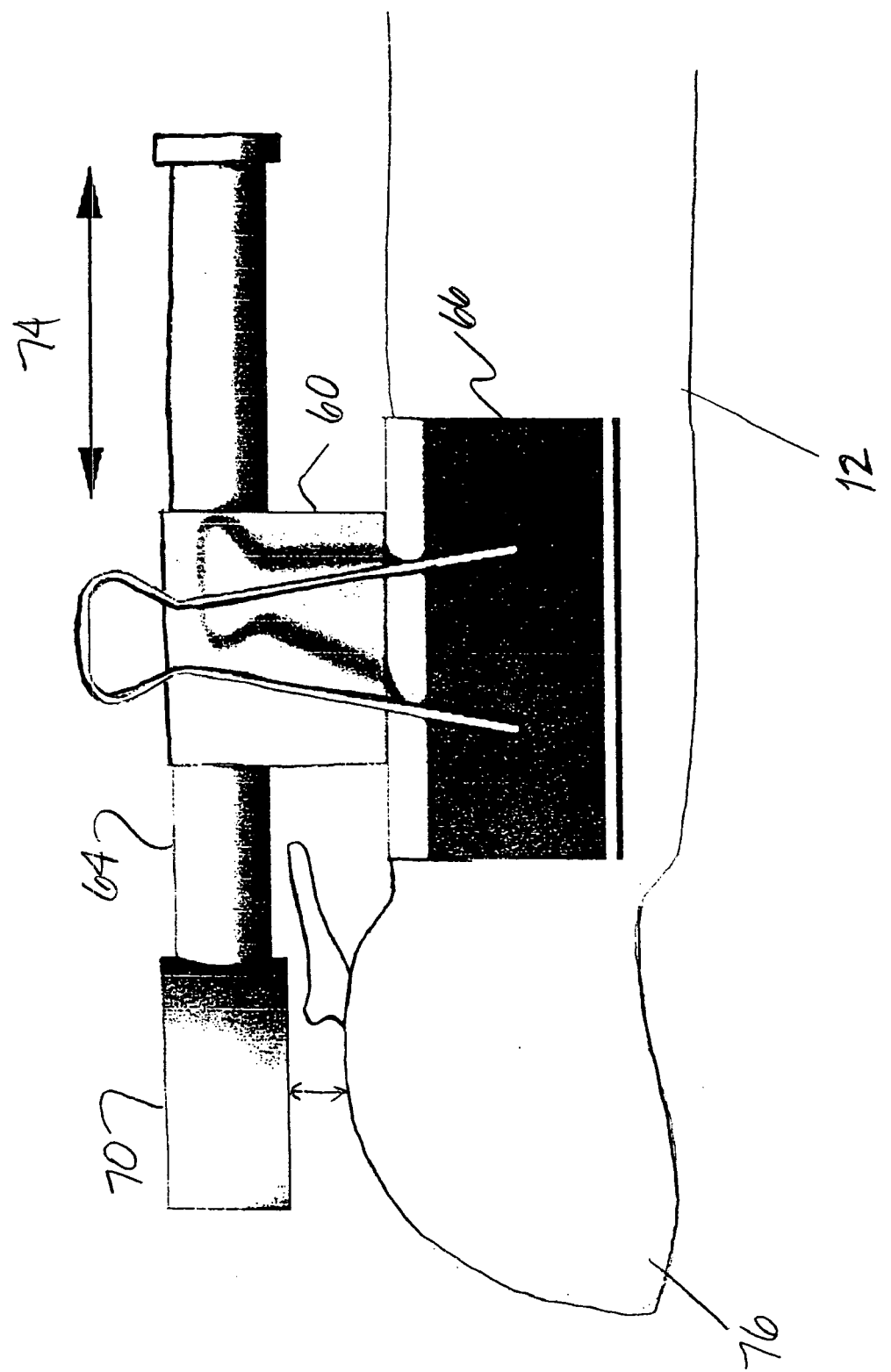
FIG. 5c is a side elevation of the trailer hitch sensor unit received by the trailer hitch with alignment over the coupler of the trailer hitch according to the present invention.

Optional trailer hitch sensor unit 60, best illustrated in FIGS. 4a and 4b, includes a base 62 and an elongate arm 64 received in an opening sleeve 68 of the base. Base 62 includes a clamping means 66 for securing trailer hitch sensor unit 60 to trailer hitch 12. It should be appreciated that clamping means 66 may include a plurality of methods for attaching to a neck of trailer hitch 12, such as a clamp, a clip, a friction fitted clamp, and the like. In the illustrative embodiment of FIG. 5c, trailer hitch sensor unit 60 attaches to the neck of trailer hitch 12 using clamping means 66 (FIGS. 4a and 4b). A plurality of clamping means 66 may be utilized to secure trailer hitch sensor unit 60 to trailer hitch 12 such as a magnetic attachment means to secure base 62 onto the trailer hitch or a U-shaped clamp that frictionally engages the trailer hitch. Trailer hitch sensor 70 and a stopper rim 72 are received on opposite ends of elongate arm 64. In this illustrative embodiment of FIGS. 4a and 4b, elongate arm 64 slides relative to base 62 along opening sleeve 68, as shown by arrow 74 of FIGS. 4a and 5b, to position trailer hitch sensor 70 over coupler 76 of trailer hitch 12 (FIG. 5c). Stopper rim 72 prevents elongate arm 64 from completely disengaging from opening sleeve 68. Elongate arm 64 may be adjustable within opening sleeve 68 with the use of detents or the like to adjust the position of trailer hitch sensor 70. Elongate arm 64 may also be provided with a means for securely fastening elongate arm 64 in opening sleeve 68, such as with a screw or the like. Trailer hitch sensor unit 60 may be powered with a portable power source, such as a lithium ion battery.

Figure 6A:
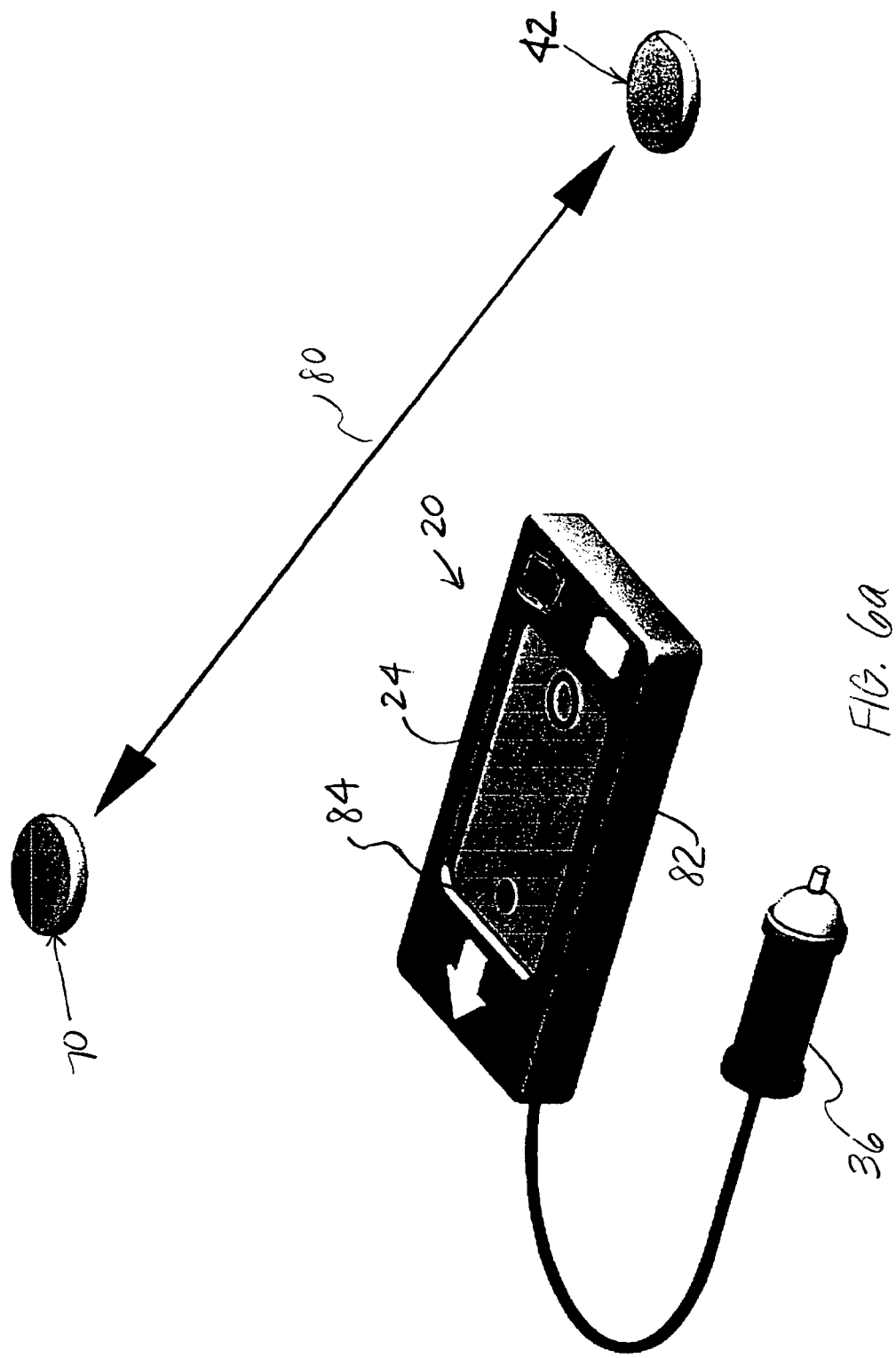
FIG. 6a illustrates the control unit of the present invention displaying the relationship in position of the hitch sensor and the trailer hitch sensor.
Figure 6B:
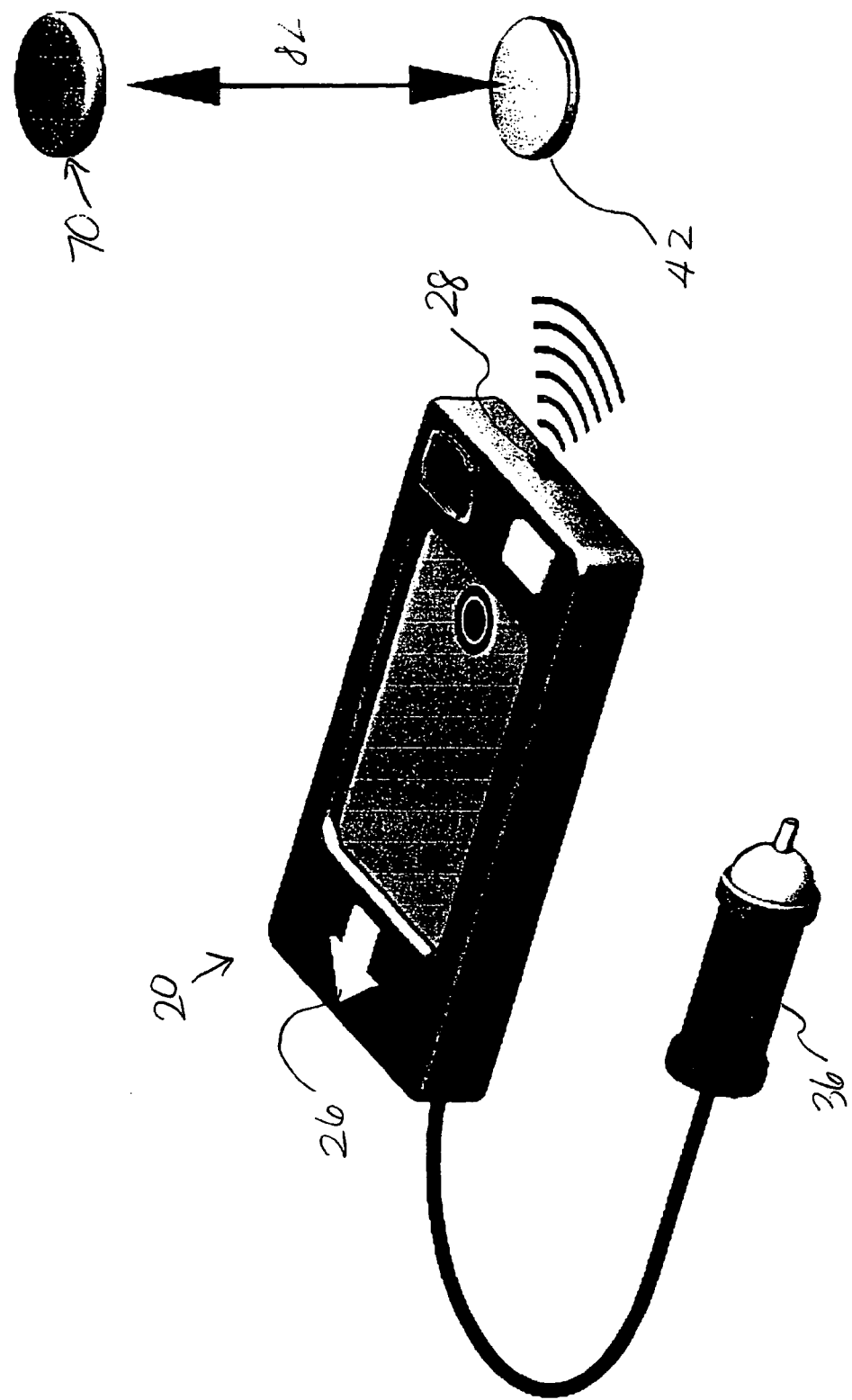
FIG. 6b illustrates the control unit with the vehicle hitch sensor and trailer hitch sensor aligned and the control unit indicating alignment according to one of the embodiments of the present invention.

During the alignment process, the user positions vehicle sensor unit 40 on vehicle hitch 16, which is a ball valve in the illustrative embodiments, and positions trailer hitch sensor unit 60 on trailer 11 to position trailer hitch sensor 70 over coupler 76. The user backs vehicle 14 towards trailer 11 (FIG. 1) using control unit 20 and display 24 to assist in aligning vehicle hitch sensor 42 with trailer hitch sensor 70, as illustrated in FIG. 6a. As vehicle 14 moves toward trailer 11, vehicle hitch sensor 42 and/or trailer hitch sensor 70 communicate with control unit 20 to provide electronic circuit 34 with information to calculate and display the relative positions of sensors 42, 70 on display screen 24. Display screen 24 displays non-vertical alignment distance, illustrated by an arrow 80 in FIG. 6a, between vehicle hitch sensor and trailer hitch sensor 70 with ball 52 representing vehicle hitch sensor and ring 54 representing trailer hitch sensor 70. Communication between vehicle hitch sensor, trailer hitch sensor 70, and control unit 20 may by accomplished with radio frequency coupling. Display screen 24 graphically represents the positions of vehicle hitch sensor and trailer hitch sensor 70 relative to one another to assist the user in aligning the sensors, as shown in FIGS. 5b, 6a, and 6b. Display screen 24 may include a grid pattern to represent the spatial relationship between sensors 42, 70. The grid may be scaled to represent one unit as a foot or other distance determined by user.

The user uses display screen 24 to determine whether to turn left, turn right, back in or go forward in order to align vehicle hitch sensor 40 with trailer hitch sensor 70. The process continues until vehicle hitch sensor 40 is directly aligned below trailer hitch sensor 70, as represented by an arrow 82 (FIG. 6b). When vehicle hitch sensor 40 is directly aligned with trailer hitch sensor 60, ball 52 and ring 54 intersect on display screen 24. Further, electronic circuit 34 recognizes an intersection or alignment of sensors 42, 70 and may send a message to illuminate light 26 or sound speaker 28. At this time, the user places vehicle 14 into park, exits to the rear of the vehicle, removes vehicle hitch sensor unit 40, and uses jack 13 to lower trailer hitch coupler 76 onto vehicle hitch 16. The precise positioning of vehicle hitch 16 directly under coupler 76 allows coupling without requiring additional movement of trailer 11 for coupling with the vehicle hitch. There are various methods mapping the relative coordinates of each sensor 42, 70 to be displayed on display screen 24. A plurality of methods, well known in the art, can be utilized to precisely map and display the relative positions of each sensor 42, 70, such methods include using a Cartesian coordinate system, a robotics coordinate system, or the like. Alternatively, mapping methods and coordinate systems utilizing electromagnetic fields can also be utilized to display relative positions of sensors 42,70.

In an alternative embodiment of the present invention, control unit 20 may be integrated into vehicle 14 as an original equipment manufacturer installed part into the dash, rear view mirror, side mirror, instrument panel, steering wheel, or any location viewable and defined by the user. In this embodiment, control unit 20 can use the display for the vehicle instead of having a separate display 24.

Additionally, control unit 20 may be completely portable with wireless communications and a portable power source, like a battery. Alternatively, control unit 20 may be hard-wired to vehicle hitch sensor and/or trailer hitch sensor 70 in a plurality of combinations. For example, control unit 20 may be hardwired to only one of the sensors, such as vehicle hitch sensor unit 40. Alternatively, control unit 20 may communicate with vehicle hitch sensor 42. Vehicle hitch sensor 42 communicates with, or merely sees and/or senses, trailer hitch sensor 70.

In another form of the method for displaying the position of sensors 42,70 in the present invention, display 24 may be configured to show the position of trailer hitch sensor 42 as a stationary base point on the display with position of vehicle hitch sensor 70 being dynamic, and vice versa. Furthermore, display screen 24 may be a touch screen communicating with electronic circuit 34. The touch screen provides user select inputs for calibrating, adjusting and setting up components of trailer alignment system 10, such as sensor sensitivity.

In an alternative embodiment for vehicle hitch sensor unit 40, the vehicle hitch sensor unit 40 may be attached to vehicle hitch 16 in a plurality of ways while still keeping within the spirit and scope of the present invention. For example, vehicle hitch sensor unit 40 may be integrated with a C-shaped clamp to attach to neck 48 of vehicle hitch 16. The C-shaped housing frictionally engage neck 48 of vehicle hitch 16. Further, vehicle hitch sensor unit 40 may attach to vehicle hitch 16 using a magnet, tape, or other adhesive means. Additionally, vehicle hitch sensor unit 40 may attach below or around vehicle hitch 16 to expose the vehicle hitch to directly couple with trailer hitch 12.

Further, another embodiment of the present invention provides a single sensor, such as vehicle hitch sensor unit 40, configured for displaying the position of the sensor unit relative to other objects and structures surrounding the sensor. The single sensor set up could use ultrasonic, sonar, radar, or light methods to determine objects and structures surrounding the sensor. For example, a single sensor can be placed on vehicle hitch 16 with the one sensor able to detect surroundings including trailer hitch 12, as well as other objects and structures. Such a sensor could be ultrasonic or light-based to discern surroundings for providing a display on screen 24. Alternatively, a camera may be integrated into vehicle hitch sensor unit 40 with picture displayed on screen 24. In this embodiment, the screen display can be reversed as to help reduce disorientation by the user of the system.

Vehicle hitch sensor unit 40 also may be integrated directly within vehicle hitch 16. Cavity 44 of vehicle hitch sensor unit 40 may be designed to accommodate a plurality of different vehicle hitch diameters. Recess cavity 44 may be adjustable or flexible to accommodate a plurality of different vehicle hitch diameters. For example, recess cavity 44 may include a plurality of interconnected concentric rings which are movable and interconnected and allow the cavity to accept vehicle hitches 16 of a plurality of diameters securely.

In an alternative embodiment for clamping means 66 includes a bolt on body 90 with a bolt 92 that may be tightened to secure and clamp trailer hitch sensor unit 60 onto trailer hitch 12, as best illustrated in FIGS. 7a and 7b. Body 90 includes an aperture 94 for receiving bolt 92 therethrough. Bolt 92 is then tightened to secure body 90 onto trailer hitch 12. Moreover, an additional bolt 92 may be tightened on an opposite side of body 90 as another embodiment for positioning sensor 70. Trailer hitch sensor unit 60 operates in a similar manner as discussed above. Additionally, in another embodiment for clamping means 66, body 90 may include a magnet that may be releasably positioned at trailer hitch 12.

Figure 8A:
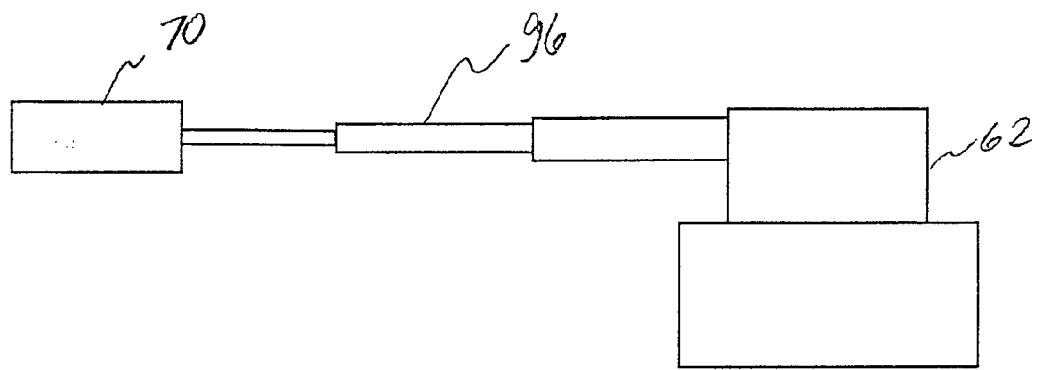
FIG. 8a is a side elevation of a trailer hitch sensor according to yet another embodiment of the present invention.
Figure 8B:
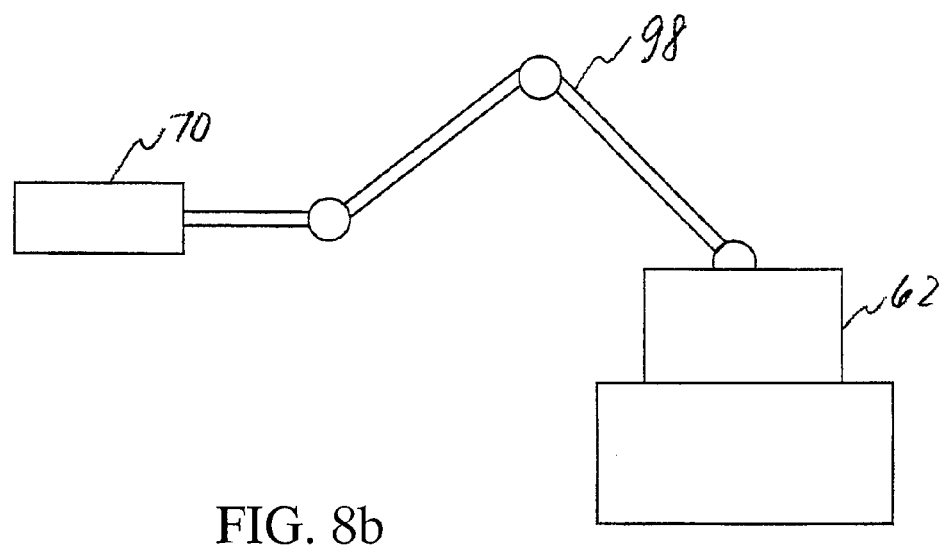
FIG. 8b is the same view as FIG. 8a showing the trailer hitch sensor in a different position.

In an alternative embodiment for elongate arm 64, the positioning of elongate arm 64 may be accomplished in a plurality of methods to place trailer hitch sensor 70 directly over trailer hitch coupler 76 (as best illustrated in FIG. 5c). One method provides elongate arm 64 as a telescopic arm 96 connected to base 62, as illustrated in FIG. 8a, and thus eliminating the need for opening sleeve 68. The telescopic elongate arm retracts to and from base 62 to position trailer hitch sensor 70 directly over coupler 76. Another method provides elongate arm 64 is a pivoting arm 98 received in base 62 with trailer hitch sensor 70 at the end of the arm to be positioned over trailer hitch 12, as best illustrated in FIG. 8b.

Additionally, it should be mentioned that the present invention contemplates the application of trailer hitch alignment system 10 with other trailer hitching systems such as pintle hook systems, fifth wheel hitches, or any other coupling device, in addition to ball and socket hitches illustrated in the figures. In the alternative systems, vehicle hitch sensor unit 40 is releasably mounted to the coupling device, which may be a pintle hook or a fifth wheel hitch. Trailer hitch alignment system 10 assists users in aligning these additional types of coupling devices with the hitch of a trailer in the same manner provided above while still keeping within the spirit of the present invention.

Therefore, the present invention provides an electronic trailer hitch alignment system for assistance in a trailer alignment process. The electronic trailer hitch alignment system includes a control unit with a display, a first sensor attached to a vehicle hitch on a trailer and a second sensor attached to a socket hitch of the trailer hitch. The two sensors communicate with the control unit to display the relative positions of each sensor with respect to each other to provide an aid to a user for aligning a vehicle hitch with the socket hitch of the trailer. Additionally, the present invention provides an electronic trailer hitch alignment system that is wireless and portable and easily integrated onto a vehicle and a trailer. Further, the present invention provides an electronic trailer hitch alignment system with a plurality of indicators of the relative position of the sensors to one another, including a display, a light, a speaker, and the like.

With respect to the above description, it is to be realized that optimum dimensional relationships for the parts of the invention, to include variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact instruction and operation shown and described, and accordingly, all suitable modification and equivalents may be resorted to, falling within the scope of the invention.

We claim:

1. An electronic trailer hitch alignment system comprising:
   a control unit including an indicator; and
   a sensor adapted to be positioned on a first hitch, said sensor communicates with said control unit;
   wherein said sensor senses the relative position of a vehicle hitch unit that is releasably supported by a second hitch, wherein said vehicle hitch unit comprises a housing with a dome-shaped cavity that is adapted to receive the second hitch, wherein said indicator of said control unit displays the relative positions of said sensor and said vehicle hitch unit with respect to each other.

2. The electronic trailer hitch alignment system of claim 1, wherein said sensor communicates with said control unit using wireless communication.

3. The electronic trailer hitch alignment system claim 1, wherein said second hitch comprises a ball hitch.

4. The electrical trailer hitch alignment system of claim 3, wherein said housing has a size and shape that does not substantially increase the overall size of the ball hitch when said dome-shaped cavity receives said ball hitch.

5. The electronic trailer hitch alignment system of claim 1, wherein said indicator comprises a display screen.

6. The electronic trailer hitch alignment system of claim 1, wherein said indicator comprises a light, said light illuminates to communicate alignment of said sensor and said vehicle hitch unit.

7. The electronic trailer hitch alignment system of claim 1, wherein said indicator comprises a speaker, said speaker sounds to communicate alignment of said sensor and said vehicle hitch unit.

8. The electronic trailer hitch alignment system of claim 1, wherein said control unit includes a battery.

9. The electronic trailer hitch alignment system of claim 8, wherein said control unit includes a connectable power source.

10. The electronic trailer hitch alignment system of claim 1, wherein said control unit includes an electronic circuit.

11. The electronic trailer hitch alignment system of claim 10, wherein said electronic circuit is electrically connected to and communicates with said indicator.

12. The electronic trailer hitch alignment system of claim 11, wherein said electronic circuit communicates with said sensor.

13. An electronic trailer hitch alignment system comprising:
   a control unit including an indicator; and
   a sensor received in a housing, said housing including a dome-shaped surface adapted to be releasably positioned on a first hitch;
   wherein said sensor senses the relative position of another sensor adapted to be positioned at a second hitch, said indicator of said control unit displays the relative positions of said sensor and said another sensor with respect to each other;
   a base adapted to he releasably positioned at a second hitch;
   a member adapted to move said another sensor relative to said base;
   wherein at least one of said sensor and said another sensor communicates with said control unit and said indicator indicates the relative position of said sensor to said another sensor with respect to each other wherein said member comprises an elongate arm, and an end of said elongate arm receives said another sensor.

14. An electronic trailer hitch alignment system comprising:
   a control unit including an indicator; and
   a sensor received in a housing, said housing including a dome-shaped surface adapted to be releasably positioned on a first hitch;
   wherein said sensor senses the relative position of another sensor adapted to be positioned at a second hitch, said indicator of said control unit displays the relative positions of said sensor and said another sensor with respect to each other;
   a base adapted to be releasably positioned at a second hitch;
   a member adapted to move said another sensor relative to said base;
   wherein at least one of said sensor and said another sensor communicates with said control unit and said indicator indicates the relative position of said sensor to said another sensor with respect to each other wherein said member comprises a pivoting arm, and a free end of said pivoting arm receives said another sensor.

15. An electronic trailer hitch alignment system comprising:
   a control unit including an indicator; and
   a sensor received in a housing, said housing including a dome-shaped surface adapted to be releasably positioned on a first hitch;
   wherein said sensor senses the relative position of another sensor adapted to be positioned at a second hitch, said indicator of said control unit displays the relative positions of said sensor and said another sensor with respect to each other;
   a base adapted to be releasably positioned at a second hitch;
   a member adapted to move said another sensor relative to said base;
   wherein at least one of said sensor and said another sensor communicates with said control unit and said indicator indicates the relative position of said sensor to said another sensor with respect to each other wherein said member comprises a telescoping member telescoping to and from said base, and a free end of said telescoping member receives said another sensor.

16. An electronic trailer hitch alignment system comprising:

a control unit including an indicator; and a sensor received in a housing, said housing including a dome-shaped surface adapted to be releasably positioned on a first hitch;

wherein said sensor senses the relative position of a second hitch, said indicator of said control unit displays the relative positions of said sensor and said second hitch with respect to each other;

a base adapted to be releasably positioned at a second hitch;

a member received in said base, said member receiving another sensor, said member moving relative to said base to position said another sensor directly over said second hitch;

wherein at least one of said sensor and said another sensor communicates with said control unit and said indicator indicates the relative position of said sensor to said another sensor with respect to each other wherein said base includes an opening sleeve therein, wherein said opening sleeve receives said member.

17. The electronic trailer hitch alignment system of claim 16, wherein said base includes a clamp to releasably position said base at said second hitch.

18. The electronic trailer hitch alignment system of claim 16, wherein said base includes a magnet to releasably position said base at said second hitch.

19. A method alignment of a vehicle hitch of a vehicle with a trailer hitch of a trailer comprising:

placing a first sensor on the vehicle hitch;

moving the vehicle with the vehicle hitch towards the trailer with the trailer hitch;

sensing the position of the trailer hitch relative to the first sensor as the vehicle moves toward the trailer;

communicating the position of the trailer hitch relative to the first sensor to an indicator of a control unit;

indicating with said indicator the position of the trailer hitch relative to said first sensor to a user as the vehicle moves toward the trailer;

aligning the vehicle hitch directly under the first sensor and the trailer hitch with the assistance of the indicator;

removing the first sensor from the vehicle hitch after said aligning; and coupling the vehicle hitch and the trailer hitch after said removing.

20. The method of claim 19 further comprising:

placing a second sensor on the trailer hitch;

sensing the position of the second sensor relative to the first sensor as the vehicle moves toward the trailer;

communicating the relative positions of the second sensor and the first sensor to the indicator of the control unit;

indicating the relative positions of the second sensor and the first sensor to the user; and aligning the second sensor directly over the first sensor with the assistance of the indicator to align the vehicle hitch and the trailer hitch.

21. The electronic trailer hitch alignment system of claim 13, wherein said base includes a clamp to releasably position said base at said second hitch.

22. The electronic trailer hitch alignment system of claim 13, wherein said base includes a magnet to releasably position said base at said second hitch.

* * * * *

UNITED STATES PATENT AND TRADEMARK OFFICE
CERTIFICATE OF CORRECTION

PATENT NO.         : 7,309,075 B2                                      Page 1 of 1
APPLICATION NO. : 11/158808
DATED              : December 18, 2007
INVENTOR(S)        : J. Edward Ramsey and John S. Betts It is certified that error appears in the above-identified patent and that said Letters Patent is hereby corrected as shown below:

Column 9
Line 37, Claim 3, "system claim" should be --system of claim--.

Column 10
Line 10, Claim 13, "he" should be --be--.

Signed and Sealed this

Twenty-sixth Day of August, 2008

JON W. DUDAS
*Director of the United States Patent and Trademark Office*